(12) United States Patent
Takahashi

(10) Patent No.: US 11,913,781 B2
(45) Date of Patent: Feb. 27, 2024

(54) MEASUREMENT DEVICE

(71) Applicant: TOYOTA JIDOSHA KABUSHIKI KAISHA, Aichi-ken (JP)

(72) Inventor: Yuichi Takahashi, Seto (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/972,592

(22) Filed: Oct. 25, 2022

(65) Prior Publication Data

US 2023/0168073 A1 Jun. 1, 2023

(30) Foreign Application Priority Data

Nov. 30, 2021 (JP) ................................. 2021-194256

(51) Int. Cl.
*G01B 5/12* (2006.01)
*G01B 5/00* (2006.01)

(52) U.S. Cl.
CPC .............. *G01B 5/12* (2013.01); *G01B 5/0002* (2013.01)

(58) Field of Classification Search
CPC .................................... G01B 5/12; G01B 3/34
USPC ..................................................... 33/1 N, 534
See application file for complete search history.

(56) References Cited

U.S. PATENT DOCUMENTS

| | | | | |
|---|---|---|---|---|
| 3,648,377 A * | 3/1972 | Witzke | ................... | G01B 7/282 33/550 |
| 5,551,162 A * | 9/1996 | Struble | .................... | G01B 5/14 33/546 |
| 7,165,335 B2 * | 1/2007 | McMurtry | ............ | G01B 5/004 33/503 |
| 8,635,783 B2 * | 1/2014 | McDonnell | .......... | G01B 21/045 33/502 |
| 8,908,901 B2 * | 12/2014 | Mamour | ................ | G01B 5/012 382/100 |
| 9,803,966 B2 * | 10/2017 | Pettersson | .............. | G01B 5/008 |
| 10,422,620 B2 * | 9/2019 | Sato | ....................... | G01B 5/012 |
| 11,781,849 B2 * | 10/2023 | Asanuma | ............... | G01B 5/016 33/503 |
| 11,819,994 B2 * | 11/2023 | Green | .................... | B25G 1/102 |
| 2015/0369581 A1 * | 12/2015 | Toso | ....................... | G01B 3/26 702/94 |
| 2020/0049478 A1 | 2/2020 | Fukaura et al. | | |

FOREIGN PATENT DOCUMENTS

| JP | 2006317395 A | 11/2006 |
|---|---|---|
| JP | 202027030 A | 2/2020 |

\* cited by examiner

*Primary Examiner* — George B Bennett
(74) *Attorney, Agent, or Firm* — HAUPTMAN HAM, LLP

(57) ABSTRACT

A measurement device according to one embodiment of the present disclosure is a measurement device that measures a position of an annual part to be measured that is arranged at an opening edge of a hole formed in a member to be measured, and the measurement device includes: a probe that is displaceable in an axial direction; a holder that holds the probe; and a measurement instrument that measures displacement of the probe in the axial direction. The probe includes an inclined portion at an tip end of the probe, the inclined portion being inclined relative to a central axis of the probe at an angle equal to an angle defined between a central axis of the hole in the member to be measured and a horizontal plane in a state in which the member to be measured is mounted on the horizontal plane.

4 Claims, 10 Drawing Sheets

MEASUREMENT DEVICE

CROSS-REFERENCE TO RELATED APPLICATION

This application claims priority to Japanese Patent Application No. 2021-194256 filed on Nov. 30, 2021, incorporated herein by reference in its entirety.

BACKGROUND

1. Technical Field

The present disclosure relates to a measurement device, for example, to a measurement device of measuring the position of an annular part to be measured that is arranged at an opening edge of a hole formed in a member to be measured.

2. Description of Related Art

For example, the valve opening amount of an engine is determined by the amount of protrusion of a valve. Hence, it is important to control the position of a surface of a valve seat on the combustion chamber side in order to maintain the performance of an internal combustion engine.

For example, Japanese Unexamined Patent Application Publication No. 2006-317395 discloses a coaxiality measurement device that measures coaxiality between a valve stem guide and a valve seat.

SUMMARY

The present applicants have found the following problems. The coaxiality measurement device of JP 2006-317395 A is configured to measure the coaxiality between the valve stem guide and the valve seat, but is not configured to measure the position of a surface of the valve seat located on the combustion chamber side.

That is, the coaxiality measurement device of JP 2006-317395 A is not configured to measure the position of an annular part to be measured that is arranged at an opening edge of a hole formed in a member to be measured.

The present disclosure has been made in light of the above problems and realizes a measurement device capable of measuring the position of an annular part to be measured that is arranged at an opening edge of a hole formed in a member to be measured.

A measurement device according to one aspect of the present disclosure is a measurement device that measures a position of an annual part to be measured, the part being arranged at an opening edge of a hole formed in a member to be measured, and the measurement device includes: a probe that is displaceable in an axial direction; a holder that holds the probe; and a measurement instrument that measures displacement of the probe in the axial direction, the probe including an inclined portion at an end of the probe, the inclined portion being inclined relative to a central axis of the probe at an angle equal to an angle defined between a central axis of the hole in the member to be measured and a horizontal plane in a state in which the member to be measured is mounted on the horizontal plane.

In the above measurement device, the inclined portion may have a conical shape.

In the above measurement device, the holder may include a contact part that comes into surface-contact with a conical surface formed on a circumferential edge of a perforated portion of the member to be measured.

In the above measurement device, the probe may be removable from the holder.

According to the present disclosure, it is possible to realize the measurement device capable of measuring the position of the annular part to be measured that is arranged at the opening edge of the hole formed in the member to be measured.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, specific embodiments to which the present disclosure is applied will be described in detail with reference to the drawings. It should be noted that the present disclosure is not limited to the following embodiments. Further, in order to clarify the description, the following description and drawings are appropriately simplified.

Figure 1:
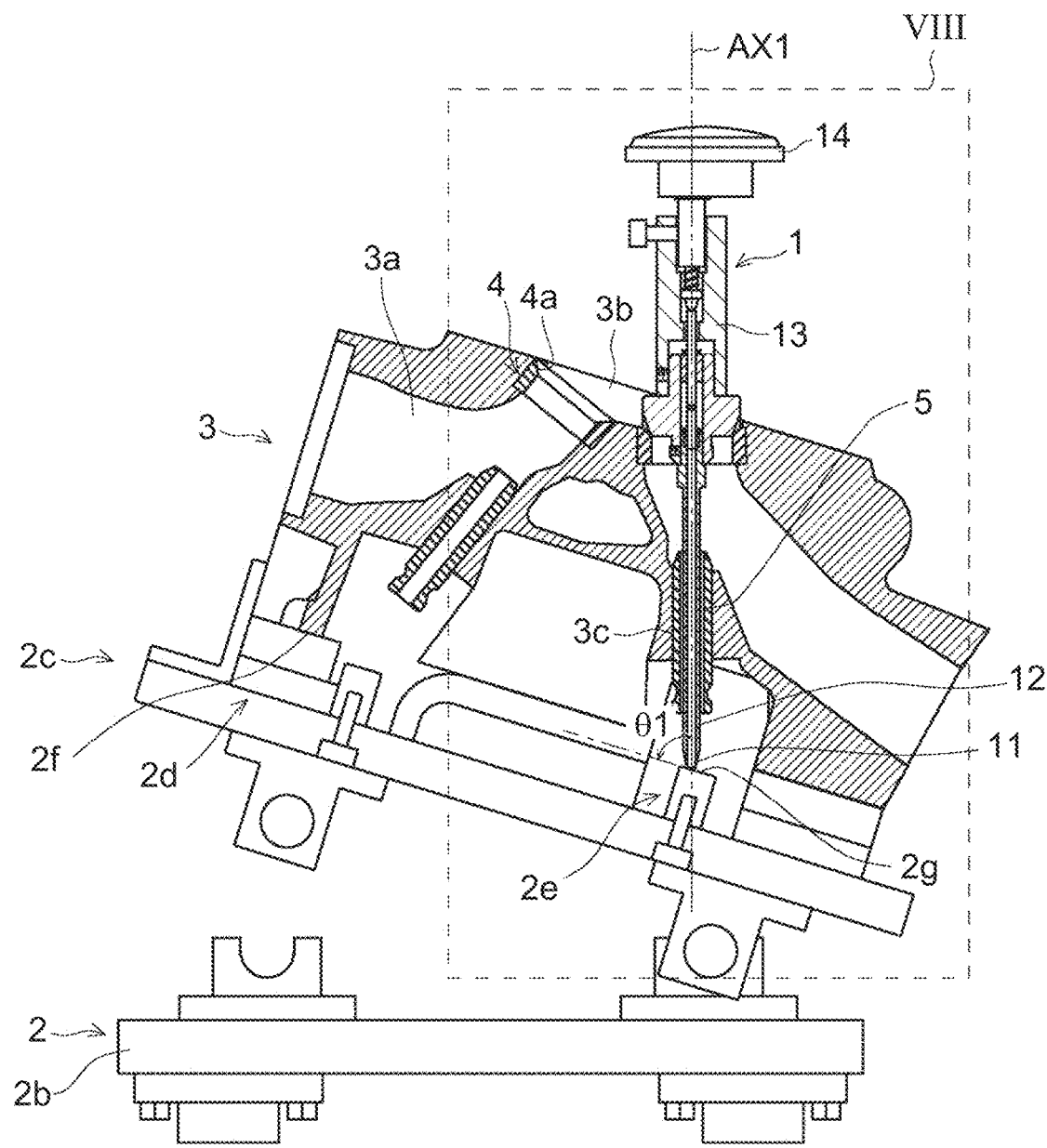
FIG. 1 is a sectional view showing a state in measuring the position of a valve seat by using a measurement device of an embodiment.

First, the configuration of the measurement device of the present embodiment will be described. FIG. 1 is a sectional view showing a state in measuring the position of a valve seat by using the measurement device of the present embodiment. The measurement device 1 of the present embodiment is suitable, for example, for measuring a distance relation between a reference surface 2g of a reference part 2e of a jig 2 and a valve seat 4 provided to a port 3a on the intake side or the exhaust side of a cylinder head 3 in a state in which the cylinder head 3 is mounted to the jig 2, as shown in FIG. 1, the valve seat 4 being located on the combustion chamber 3b side.

Figure 2:
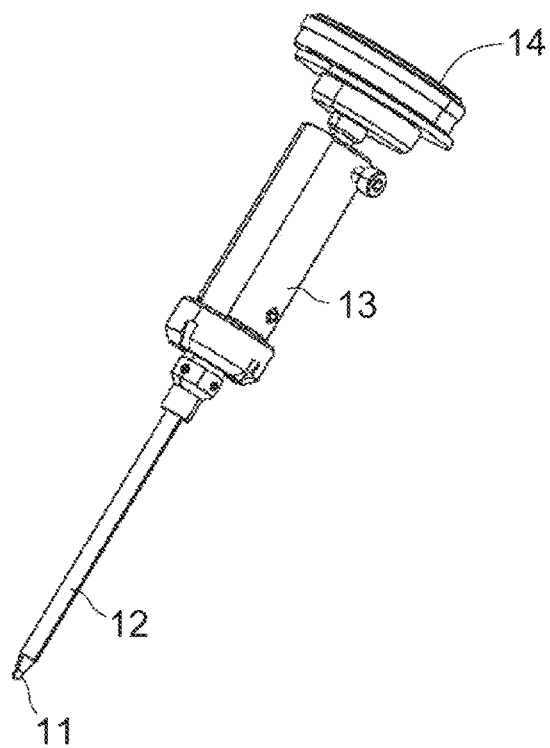
FIG. 2 is a perspective view showing the measurement device of the embodiment.
Figure 2:
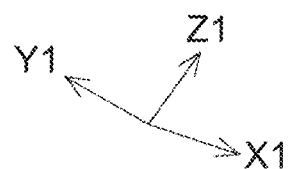
Figure 3:
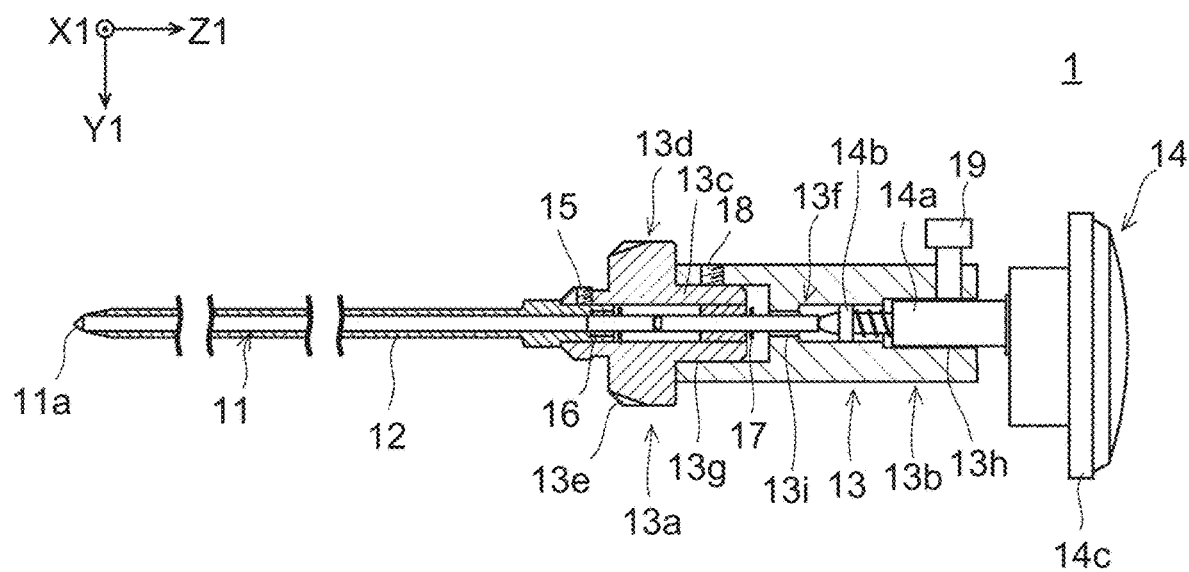
FIG. 3 is a sectional view showing the measurement device of the embodiment.
Figure 4:
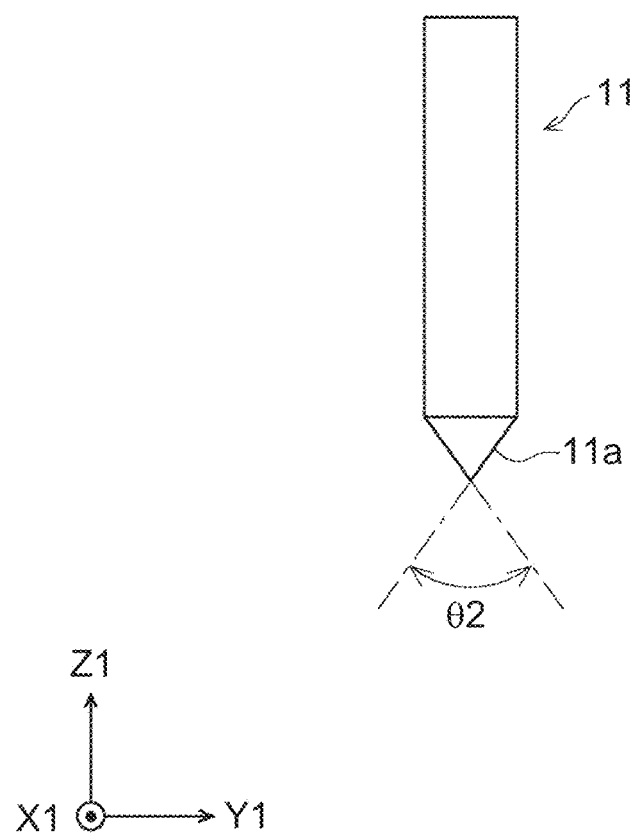
FIG. 4 is an enlarged view showing a tip end of a probe.

FIG. 2 is a perspective view showing the measurement device of the present embodiment. FIG. 3 is a sectional view showing the measurement device of the present embodiment. FIG. 4 is an enlarged view showing a tip end of a probe. Here, in order to clarify the description, the following description of the measurement device will be provided with reference to a first three-dimensional (X1Y1Z1) coordinate system shown in FIG. 2 and others. Further, the description will be provided based on the premise of an initial state before the position of the valve seat 4 is measured.

The measurement device 1 includes the probe 11, a sheath 12, a holder 13, and a dial gauge 14, as shown in FIG. 2 and FIG. 3. The probe 11 has a cylindrical shape as its basic form and extends in the Z1 axis direction, for example. The probe 11 includes an inclined portion 11a at an end (tip end) of the probe 11 on the −side of the Z1 axis.

The inclined portion 11a is inclined at an angle substantially equal to at an angle θ1 defined between a horizontal plane and a central axis AX1 of a through-hole 3c that communicates with a port 3a in the cylinder head 3 and that is provided with a stem guide 5, in a state in which the cylinder head 3 is mounted on the horizontal plane.

In this case, as shown in FIG. 4, for example, it may be configured that the inclined portion 11a has a conical shape that is gradually reduced in diameter toward the −side of the Z1 axis side, and a taper angle θ2 of the inclined portion 11a is substantially equal to twice as the angle θ1 defined between the central axis AX1 of the through-hole 3c of the cylinder head 3 and the horizontal plane.

As shown in FIG. 2 and FIG. 3, the sheath 12 has a tubular shape as its basic form and extends in the Z1 axial direction. The probe 11 is slidably arranged through the inside of the sheath 12. At this time, both ends of the probe 11 protrude from the sheath 12.

The holder 13 holds the probe 11 to be slidable in the Z1 axial direction. The holder 13 includes a positioning part 13a and a gripping part 13b. As will be described later, the positioning part 13a comes into contact with a face surface 4a of the valve seat 4 when the position of the valve seat 4 in the cylinder head 3 is measured.

The positioning part 13a includes a cylindrical portion 13c and a flange 13d. The cylindrical portion 13c has a cylindrical shape, for example. The flange 13d protrudes radially outward of the cylindrical portion 13c from the cylindrical portion 13c. The flange 13d is arranged at substantially the center of the cylindrical portion 13c in the Z1 axis direction, for example.

The flange 13d has, for example, an annular shape when viewed from the Z1 axis direction. In this case, an end of the flange 13d on the −side of the Z1 axis may be formed with a contact part 13e that can be in substantially surface-contact with the face surface 4a of the valve seat 4. The contact part 13e has a substantially conical shape that is increased in diameter toward the +side of the Z1 axis so as to correspond to the face surface 4a of the valve seat 4, for example.

The probe 11 is disposed through the inside of the cylindrical portion 13c of the holder 13 such that the portion of the probe 11 on the +side of the Z1 axis extends from the end of the cylindrical portion 13c on the +side of the Z1 axis. In addition, the end of the sheath 12 on the +side of the Z1 axis is fitted in the inside of the end of the cylindrical portion 13c on the −side of the Z1 axis, and the sheath 12 is fixed to the cylindrical portion 13c by a fastening member 15 such as a set screw, for example.

At this time, for example, a guiding member 16 such as a slide bearing may be arranged between an inner circumferential surface of the cylindrical portion 13c and the probe 11 in order to guide the sliding of the probe 11 in the Z1 axial direction.

A locking member 17 such as an e-clip may be fitted in a portion of the probe 11 located on the +side of the Z1 axis from the guiding member 16, thereby preventing the probe 11 from being removed from the cylindrical portion 13c toward the −side of the Z1 axis.

The gripping part 13b is gripped by an inspector when the inspector measures the position of the valve seat 4 in the cylinder head 3. The gripping part 13b has a cylindrical shape as its basic form. In this case, a perforated portion 13f of the gripping part 13b may include a first portion 13g, a second portion 13h, and a third portion 13i, for example.

The first portion 13g forms a portion of the perforated portion 13f located on the −side of the Z1 axis. The diameter of the first portion 13g is substantially equal to the outer diameter of the cylindrical portion 13c, and the length of the first portion 13g in the Z1 axis direction is longer than the length of a portion of the cylindrical portion 13c located on the +side of the Z1 axis from the flange 13d.

The second portion 13h forms a portion of the perforated portion 13f located on the +side of the Z1 axis. The diameter of the inner circumferential surface of the second portion 13h is substantially equal to the diameter of a stem 14a of the dial gauge 14, and the length of the second portion 13h in the Z1 axis direction is longer than the length of a portion including the stem 14a of the dial gauge 14 on the −side of the Z1 axis.

The third portion 13i is arranged between the first portion 13g and the second portion 13h. The diameter of the third portion 13i is larger than the diameter of the probe 11, and the length of the third portion 13i in the Z1 axis direction is shorter than the length of a portion of the probe 11 protruding toward the +side of the Z1 axis from the cylindrical portion 13c.

In a state in which the portion of the probe 11 on the +side of the Z1 axis is inserted through the third portion 13i of the perforated portion 13f in the gripping part 13b, the portion of the cylindrical portion 13c located on the +side of the Z1 axis from the flange 13d is fitted in the first portion 13g of the perforated portion 13f, and the cylindrical portion 13c is fixed to the gripping part 13b by a fastening member 18 such as a set screw, for example. In this case, the end of the probe 11 on the +side of the Z1 axis protrudes toward the +side of the Z1 axis from the third portion 13i of the perforated portion 13f in the gripping part 13b.

As similar to a general dial gauge, the dial gauge 14 includes the stem 14a, a spindle 14b that is slidably inserted through the stem 14a in the Z1 axis direction and that is provided with a probe on the −side of the Z1 axis, and a display part 14c for displaying a displacement of the spindle 14b.

The portion including the stem 14a of the dial gauge 14 located on the −side of the Z1 axis is fitted in the second portion 13h of the perforated portion 13f in the gripping part 13b, and for example, the dial gauge 14 is fixed to the gripping part 13b by a fastening member 19 such as a bolt.

In this case, the probe of the spindle 14b of the dial gauge 14 is in contact with the end of the probe 11 on the +side of the Z1 axis. This configuration allows the measurement device 1 of the present embodiment to measure the displacement of the probe 11 in the Z1 axial direction by the dial gauge 14. It should be noted that the measurement device 1 of the present embodiment includes the dial gauge 14; however, it is sufficient for the measurement device 1 to include a measurement instrument capable of measuring the displacement of the probe 11 in the Z1 axial direction.

It may be configured that the stem 14a of the dial gauge 14 is formed with a male screw, and the second portion 13h of the perforated portion 13f in the gripping part 13b of the holder 13 is formed with a female screw such that the male screw of the dial gauge 14 is screwed into the female screw of the holder 13 so as to fix the dial gauge 14 to the holder 13.

Figure 5:
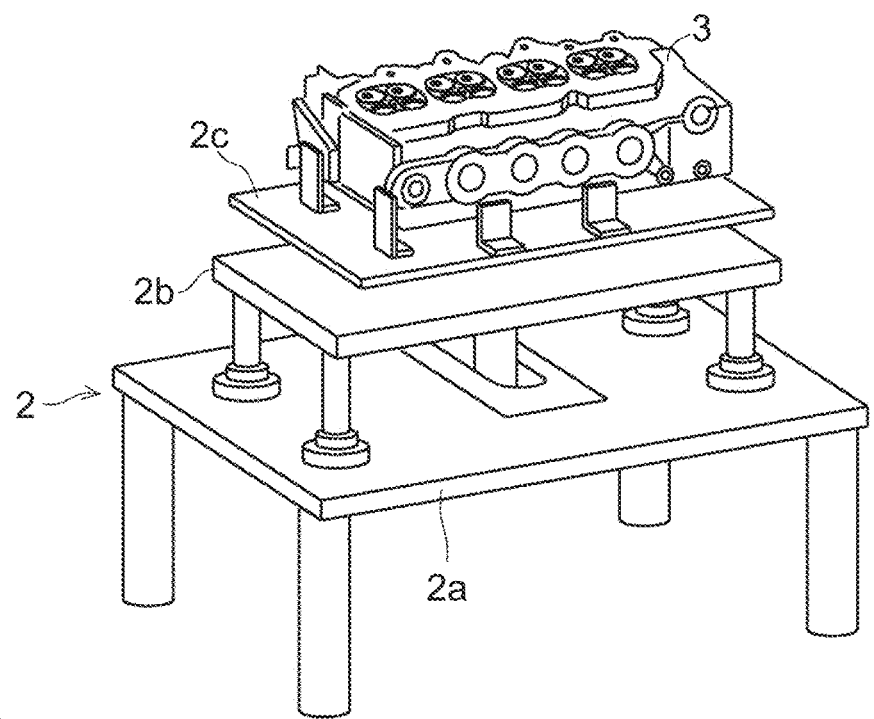
FIG. 5 is a perspective view showing a state in which a cylinder head is mounted on a jig.
Figure 5:
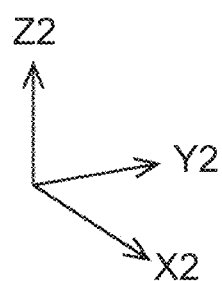
Figure 6:
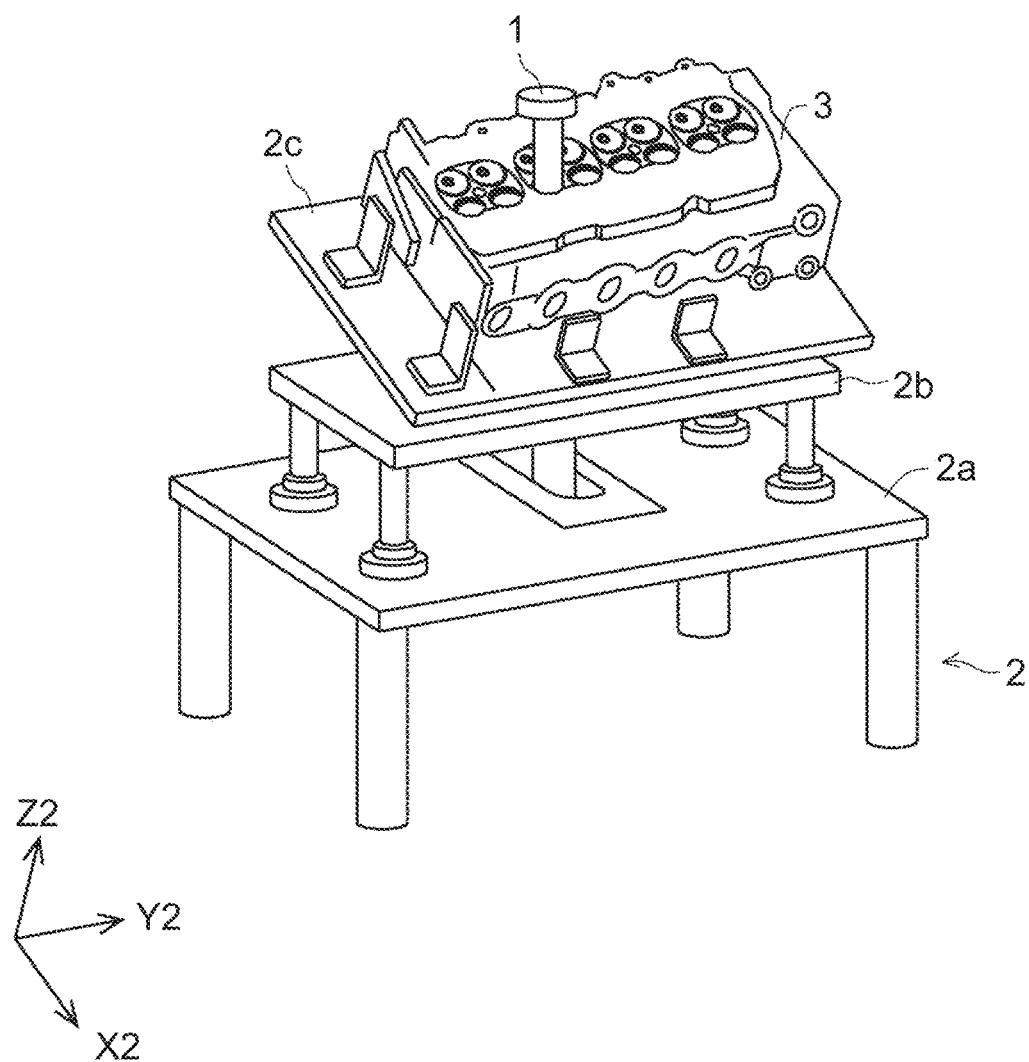
FIG. 6 is a perspective view showing how the position of the valve seat of the cylinder head is measured.
Figure 7:
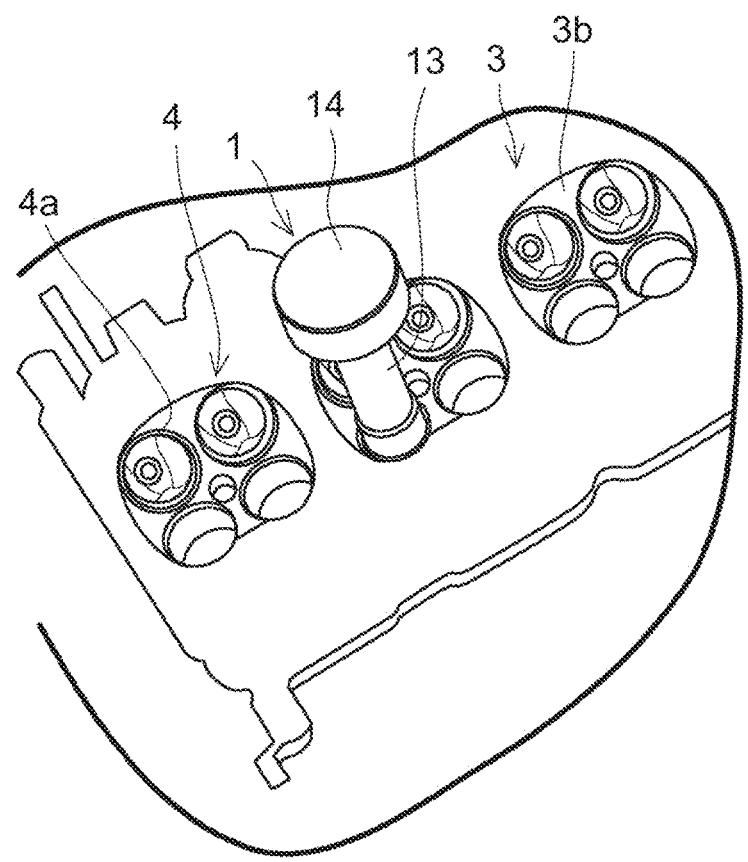
FIG. 7 is a perspective view showing a state in which the measurement device is inserted in a through-hole of the cylinder head.
Figure 8:
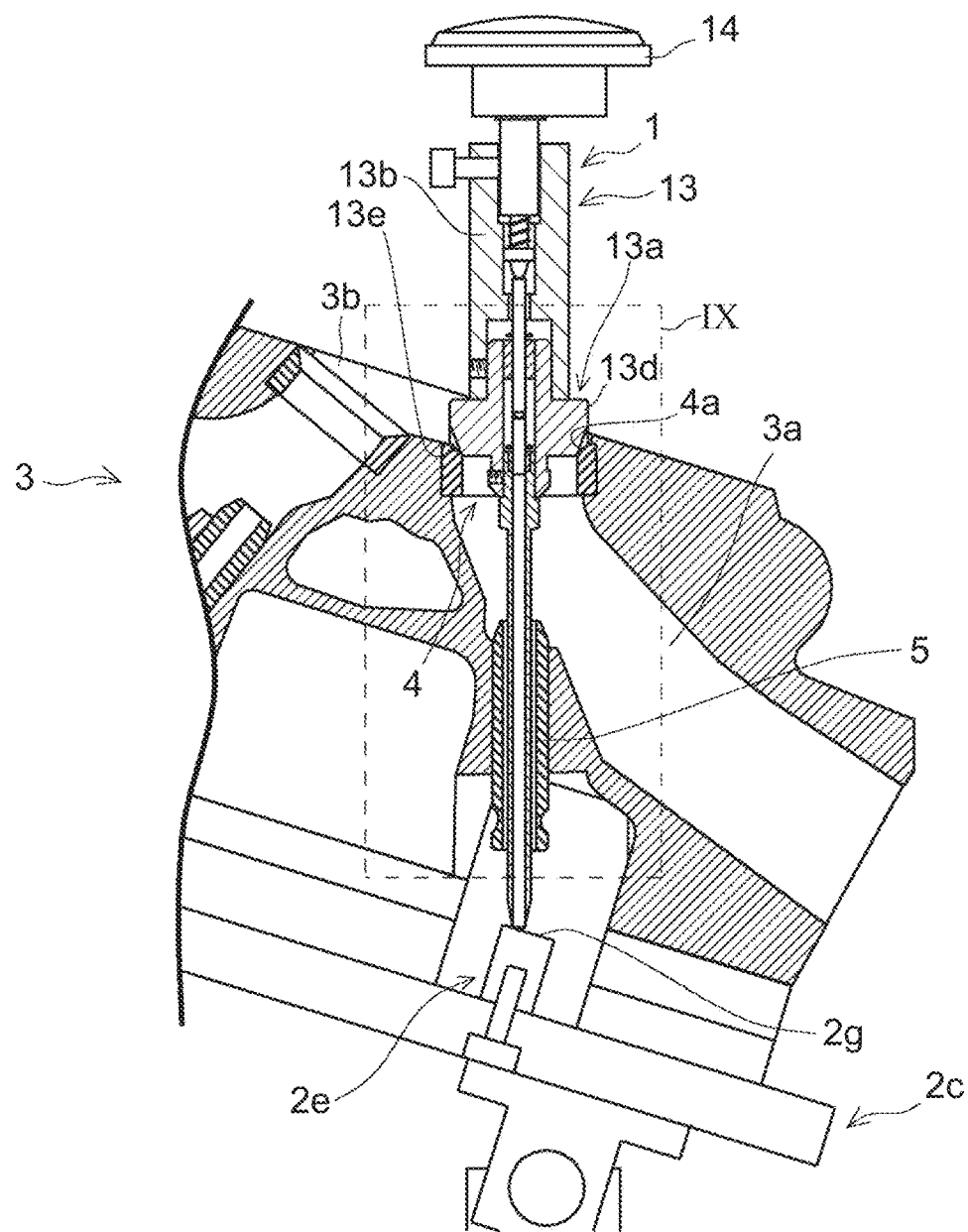
FIG. 8 is an enlarged view of a part VIII in FIG. 1.
Figure 9:
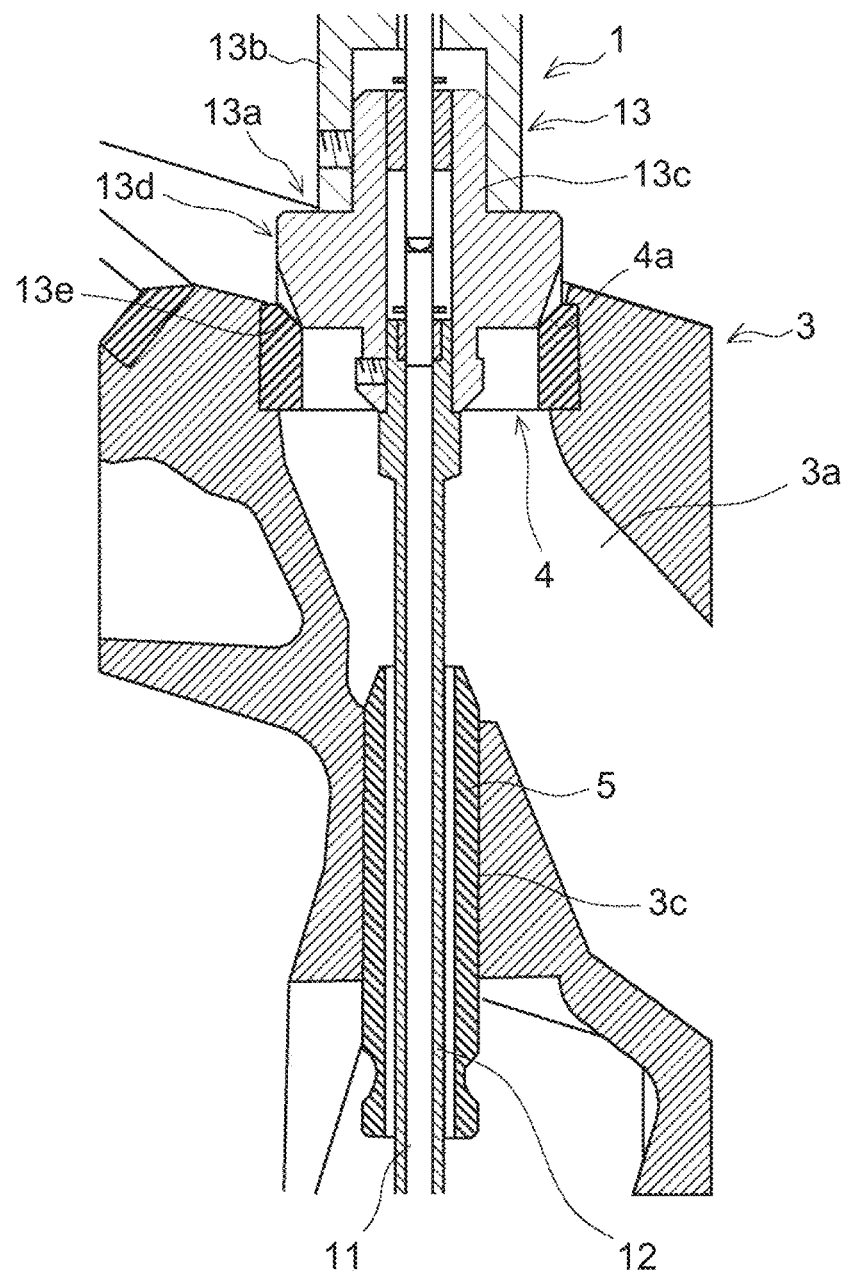
FIG. 9 is an enlarged view of a part IX in FIG. 8.
Figure 10:
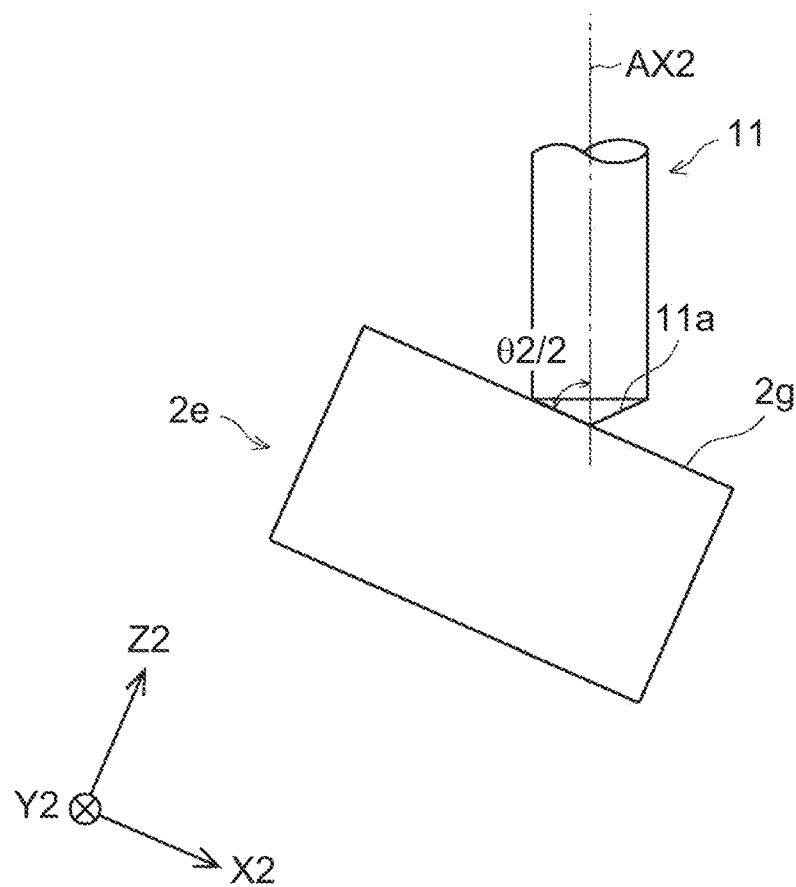
FIG. 10 is a view showing a relationship between an inclined portion of the probe and a reference surface of the jig.

Next, the flow of measuring the position of the valve seat 4 in the cylinder head 3 by using the measurement device 1 of the present embodiment will be described. FIG. 5 is a perspective view showing a state in which the cylinder head is mounted on the jig. FIG. 6 is a perspective view showing how the position of the valve seat in the cylinder head is measured. FIG. 7 is a perspective view showing a state in which the measurement device is inserted in the through-hole of the cylinder head. FIG. 8 is an enlarged view of a part VIII in FIG. 1. FIG. 9 is an enlarged view of a part IX in FIG. 8. FIG. 10 is a view showing the relationship between the inclined portion of the probe and the reference surface of the jig.

Now, in order to clarify the description, the following description of the flow of measuring the position of the valve seat 4 in the cylinder head 3 by using the measurement device 1 will provided with reference to a second three-dimensional (X2Y2Z2) coordinate system shown in FIG. 5 and others.

In this case, the X2Y2 plane is a plane parallel to a mounting surface 2f of a fixing part 2d and the reference surface 2g of the reference part 2e in the mounting base 2c of the jig 2. Hence, the X2Y2 plane is rotatable around the Y2 axis as described later, for example, and forms a horizontal plane with reference to the second coordinate system.

Now, as shown in FIG. 5, the jig 2 includes a table 2a, an elevation stand 2b provided on the table 2a to be movable up and down, and a mounting base 2c provided on the elevation stand 2b to be tiltable around the Y2 axis. The mounting base 2c is provided with the fixing part 2d and the reference part 2e as shown in FIG. 1.

As shown in FIG. 1, the fixing part 2d protrudes from the mounting base 2c toward the +side of the Z2 axis, and the end of the fixing part 2d on the +side of the Z2 axis includes the mounting surface 2f substantially parallel to the X2Y2 plane. For example, the fixing part 2d is arranged at a position corresponding to four corners of the end of the cylinder head 3 opposite to the combustion chamber 3b side when viewed from the Z2 axis direction. For example, the end of the cylinder head 3 opposite to the combustion chamber 3b side is fixed to the fixing part 2d in a state of being mounted on the mounting surface 2f of the fixing part 2d.

In this case, a fixing member of fixing the cylinder head 3 to the fixing part 2d is not limited, and for example, a fastening member such as a bolt may be used. The fixing part 2d may be configured such that in a state in which the cylinder head 3 is fixed to the fixing part 2d, the end of the cylinder head 3 opposite to the combustion chamber 3b side is arranged substantially parallel to the X2Y2 plane.

As shown in FIG. 1, the reference part 2e includes the reference surface 2g at the end of the reference part 2e on the +side of the Z2 axis, the reference surface 2g protruding from the mounting base 2c toward the +side of the Z2 axis and being substantially parallel to the X2Y2 plane. The reference part 2e is arranged on the central axis AX1 of each through-hole 3c of the cylinder head 3 in a state in which the end of the cylinder head 3 opposite to the combustion chamber 3b side is mounted on the fixing part 2d.

Using the jig 2 thus configured, first, as shown in FIG. 5, the end of the cylinder head 3 opposite to the combustion chamber 3b side is mounted on the mounting surface 2f of the fixing part 2d in the mounting base 2c of the jig 2, and the cylinder head 3 is fixed to the fixing part 2d. Then, the inspector moves the elevation stand 2b of the jig 2 up and down and tiltingly moves the mounting base 2c such that the inspector can easily insert the measurement device 1 into the through-hole 3c of the cylinder head 3.

Next, as shown in FIG. 1 and FIG. 6, the inspector inserts the measurement device 1 into the through-hole 3c of the cylinder head 3. At this time, the scale of the display part 14c of the dial gauge 14 of the measurement device 1 is set such that, for example, a preset reference length between the face surface 4a of the valve seat 4 and the reference surface 2g of the reference part 2e of the jig 2 (for example, a length slightly shorter than a length between the face surface 4a of the valve seat 4 of an accepted product and the reference surface 2g of the reference part 2e of the jig 2) is set to be zero.

Then, as shown in FIG. 7 to FIG. 9, the inspector further inserts the measurement device 1 into the through-hole 3c of the cylinder head 3 and brings the contact part 13e of the flange 13d of the positioning part 13a in the holder 13 of the measurement device 1 to come into substantially surface-contact with the face surface 4a of the valve seat 4, and also brings the inclined portion 11a of the probe 11 of the measurement device 1 to come into contact with the reference surface 2g of the reference part 2e of the jig 2.

Therefore, the probe 11 of the measurement device 1 is pushed in, and the spindle 14b of the dial gauge 14 is accordingly pushed in, and then a difference from the above-mentioned reference length is displayed on the display part 14c of the measurement device 1. Accordingly, the measurement device 1 of the present embodiment can measure the position of the valve seat 4 arranged at the opening edge of the through-hole 3c of the cylinder head 3 relative to the reference surface 2g (that is, a preset reference position) of the reference part 2e of the jig 2.

At this time, the inclined portion 11a of the probe 11 of the measurement device 1 is inclined relative to the central axis AX2 of the probe 11 at an angle θ2/2 substantially equal to the angle θ1 defined between the central axis AX1 of the through-hole 3c of the cylinder head 3 and the mounting surface 2f of the fixing part 2d of the jig 2, that is, as shown in FIG. 10, the reference surface 2g of the reference part 2e of the jig 2, in a state in which the cylinder head 3 is mounted on the mounting surface 2f of the fixing part 2d of the jig 2 as the horizontal plane (X2Y2 plane).

Accordingly, the inclined portion 11a of the probe 11 of the measurement device 1 comes into substantially line contact with the reference surface 2g of the reference part 2e of the jig 2 as shown in FIG. 10. Therefore, even when the measurement of the position of the valve seat 4 is repeatedly carried out among different cylinder heads 3 by using the measurement device 1, it is possible to reduce wear of the tip end of the measurement device 1 as compared with the case of using the measurement device 1 with the probe 11 having a tip end in a spherical shape, thereby suppressing deterioration of the measurement accuracy.

As described above, the measurement device 1 of the present embodiment can measure the position of the valve seat 4, which is arranged at the opening edge of the through-hole 3c of the cylinder head 3, relative to the reference surface 2g of the reference part 2e of the jig 2.

Further, in the measurement device 1 of the present embodiment, the probe 11 of the measurement device 1 includes the inclined portion 11a; therefore, even when the measurement of the position of the valve seat 4 is repeatedly carried out among different cylinder heads 3 by using the measurement device 1, it is possible to reduce wear of the tip end of the measurement device 1 as compared with the case of using the measurement device 1 with the probe 11 having a tip end in a spherical shape, thereby suppressing deterioration of the measurement accuracy.

Further, in the measurement device 1 of the present embodiment, since the flange 13d of the positioning part 13a in the holder 13 includes the contact part 13e, it is possible to bring the contact part 13e to come into substantially surface-contact with the face surface 4a of the valve seat 4 when the position of the valve seat 4 in the cylinder head 3 is measured. Accordingly, it is possible to position the measurement device 1 with respect to the cylinder head 3 with a high accuracy, thereby enhancing the measurement accuracy.

When the positioning part 13a is removable with respect to the gripping part 13b of the holder 13 and the sheath 12, the positioning part 13a can be replaced as appropriate according to the shape of the face surface 4a of the valve seat 4 of the cylinder head 3. Moreover, when the probe 11 is removable with respect to the holder 13 via the sheath 12, the probe 11 can be replaced as appropriate according to the angle θ1 defined between the central axis AX1 of the through-hole 3c of the cylinder head 3 and the horizontal plane, for example, according to a valve included angle of the cylinder head 3. Accordingly, it is possible to enhance the versatility of the measurement device 1.

The present disclosure is not limited to the above embodiments, and can be appropriately modified without departing from the spirit.

For example, the inclined portion 11a of the probe 11 of the above embodiments has a substantially conical shape, and may have a flat inclined surface. However, considering accuracy in formation of the inclined portion 11a and the like, the inclined portion 11a may have a substantially conical shape.

For example, the shapes of the probe 11, the sheath 12, and the holder 13 of the above embodiments have been described as examples and can be appropriately changed according to the shape of the hole or the like formed in the member to be measured.

For example, in the above embodiments, the cylinder head 3 is mounted on the jig 2 when the position of the valve seat 4 in the cylinder head 3 is measured; however, the end of the cylinder head 3 opposite to the combustion chamber 3b side may be mounted on a horizontal surface such as a surface plate. It should be noted that it is sufficient to support the end of the cylinder head 3 opposite to the combustion chamber 3b side in substantially parallel to the horizontal surface, and this horizontal surface may be a virtual plane.

The measurement device 1 of the above embodiments is used for measuring the position of the valve seat 4 in the cylinder head 3, for example; however, the present disclosure is not limited to this. The measurement device 1 may be used in, for example, machining and adjustment of a machine having an opening-closing mechanisms such as a check valve, dimensional control in manufacturing valves having conical orifices for flow control or damping force generators, or may be used for measuring the position of a chamfered part provided at a mouth of a cylindrical part or a hole. In short, it is sufficient to configure the measurement device 1 of the above embodiments to be capable of measuring the position of an annular part to be measured that is arranged at an opening edge of a hole formed in a member to be measured.

What is claimed is:

1. A measurement device that measures a position of an annual part to be measured, the part being arranged at an opening edge of a hole formed in a member to be measured, the measurement device comprising:
    a probe that is displaceable in an axial direction;
    a holder that holds the probe; and
    a measurement instrument that measures displacement of the probe in the axial direction,
    the probe including an inclined portion at a tip end of the probe, the inclined portion being inclined relative to a central axis of the probe at an angle equal to an angle defined between a central axis of the hole in the member to be measured and a horizontal plane in a state in which the member to be measured is mounted on the horizontal plane.

2. The measurement device according to claim 1, wherein the inclined portion has a conical shape.

3. The measurement device according to claim 1, wherein the holder includes a contact part that comes into surface-contact with a conical surface formed on a circumferential edge of a perforated portion of the member to be measured.

4. The measurement device according to claim 1, wherein the probe is removable from the holder.

* * * * *